United States Patent [19]

Bowers et al.

[11] Patent Number: 4,572,949

[45] Date of Patent: Feb. 25, 1986

[54] FIBER OPTIC SENSOR FOR DETECTING VERY SMALL DISPLACEMENTS OF A SURFACE

[75] Inventors: John E. Bowers, Holmdel, N.J.; Gordon S. Kino, Stanford, Calif.

[73] Assignee: The Board of Trustees of the Leland Stanford Junior University, Stanford, Calif.

[21] Appl. No.: 565,091

[22] PCT Filed: Apr. 13, 1983

[86] PCT No.: PCT/US83/00533

§ 371 Date: Dec. 14, 1983

§ 102(e) Date: Dec. 14, 1983

[87] PCT Pub. No.: WO83/03684

PCT Pub. Date: Oct. 27, 1983

Related U.S. Application Data

[63] Continuation-in-part of Ser. No. 368,425, Apr. 14, 1982, abandoned.

[51] Int. Cl.[4] ............................................. H01J 5/16
[52] U.S. Cl. .................................... 250/227; 356/351; 73/657
[58] Field of Search .............. 250/227, 231 R; 356/350, 351, 358, 371; 73/655, 656, 657

[56] References Cited

U.S. PATENT DOCUMENTS

| | | | |
|---|---|---|---|
| 4,180,328 | 12/1979 | Drain | 356/349 |
| 4,313,185 | 1/1982 | Chouan | 367/149 |
| 4,380,394 | 4/1983 | Stowe | 356/358 |
| 4,420,260 | 12/1982 | Martinelli | 356/351 |
| 4,432,599 | 2/1984 | McMahon | 250/227 |

FOREIGN PATENT DOCUMENTS 2076558 12/1981 United Kingdom .

OTHER PUBLICATIONS

G. Winterling & W. Heincke, "Measurements of Phonon Lifetimes by Two Successive Light Pulses", *Physics Letters*, vol. 27A, No. 6, Aug. 12, 1968.
J. E. Bowers, "Fiber-Optical Sensor for Surface Acoustic Waves", *Applied Physics*, vol. 41, No. 3, Aug. 1, 1982.
"Single Mode Fiber Optic Directional Coupler", R. A. Bergh, G. Kotler, and H. J. Shaw, *Electronics Letters*, vol. 16, No. 7 (Mar. 27, 1980), pp. 260-261.
"Fiber Optic Laser Probe for Acoustic Wave Measurements," R. Jungerman, J. Bowers, J. Green and G. Kino, Applied Physics Letters, vol. 40, No. 4, Feb. 15, 1982, pp. 313-315.
"Measuring Pulsed Picometer-Displacement Vibrations by Optical Interferometry," by David Vilkomerson, Applied Physics Letters, vol. 29, No. 3, (Aug. 1, 1976), pp. 183-185.
"Probing of Acoustic Surface Perturbations by Coherent Light," by L. Whitman and A. Korpel, *Applied Optics*, vol. 8, No. 8, (Aug. 1969), pp. 1567-1576.
"Acoustic-Surface-Wave Amplitude and Phase Measurements Using Laser Probes," by R. M. DeLa Rue, et al., Proceedings of the Institution of Electrical Engineers, vol. 119, No. 2, Feb., 1972, pp. 117-126.
"'Sing-Around' Method for Acoustic Surface-Wave Velocity Measurements Using an Optical Probe", by Kimio Suzuki and M. Nishikawa, *Japanese Journal of Applied Physics*, vol. 13, No. 8, (Aug. 1974), pp. 1216-1218.

Primary Examiner—David C. Nelms
Assistant Examiner—J. Gatto
Attorney, Agent, or Firm—Knobbe, Martens, Olson & Bear

[57] ABSTRACT

A light source (10) coupled to a first fiber optic waveguide (14) which is coupled by a first directional coupler (22) and a second directional coupler (24) to a second waveguide (20). The first waveguide (14) has a phase modulator (60), a delay loop (62) and a polarization controller (68) therein to cause a differential delay time T on counterpropagating coherent light waves phase modulated at a frequency $1_M$. The first directional coupler (22) has one part connected to a photodector (28) and the second directional coupler (24) has a probe (20D) coupled to the first fiber (14) and the second fiber (20). The probe directs light toward a surface (18) whereupon the counterpropagating waves are shifted in phase by an amount proportional to the amplitude of displacement of the surface 18.

36 Claims, 14 Drawing Figures

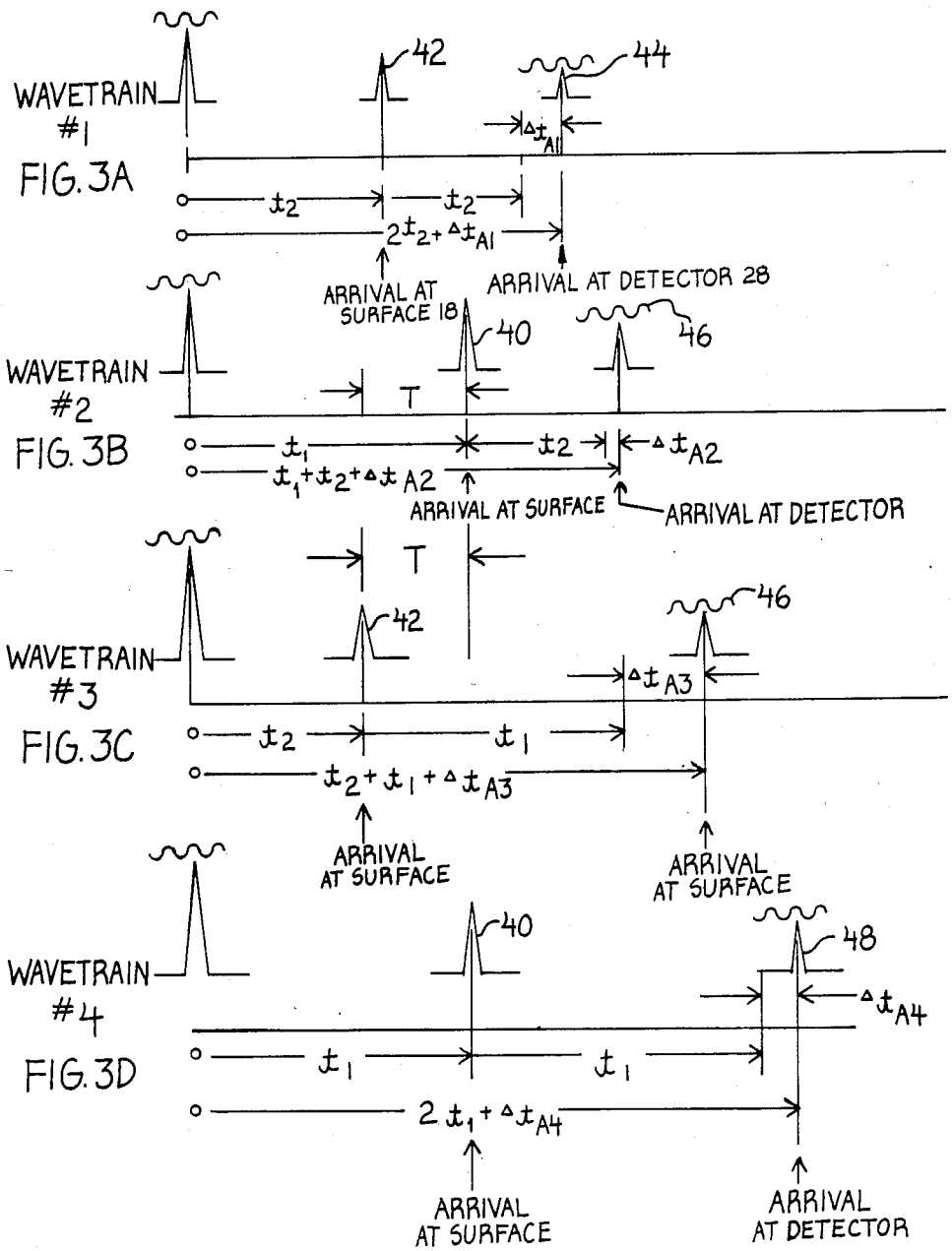

FIBER OPTIC SENSOR FOR DETECTING VERY SMALL DISPLACEMENTS OF A SURFACE

BACKGROUND OF THE INVENTION

This application is a continuation-in-part of U.S. patent application Ser. No. 368,425, filed Apr. 14, 1982 now abandoned.

This invention relates generally to sensors for detecting very small displacements of a surface, and, more particularly, the invention relates to an improved surface acoustic wave sensor which employs an optical fiber interferometer.

The invention is primarily useful as a surface acoustic wave detector of greatly improved sensitivity over the surface acoustic wave detectors of the prior art. A surface acoustic wave is a wave representing vibration which is propagating through a solid and causes the surface of the solid to undulate.

The invention also has application in other fields as well. Because the invention described herein can detect the amplitude and frequency of the displacement of a reflecting surface, it is apparent that the invention can also be used in any other application where it is necessary to detect very small movements of a surface. Typically, the displacements of the surface which can be sensed by the invention described herein can range as low as 0.0003 angstroms. An angstrom is $10^{-10}$ meters.

As an example, the invention could be used as a very sensitive modulator to change the phase of one light wavetrain relative to another wavetrain in proportion to the small displacements of a reflecting surface such as a mirror which is mechanically moved in accordance with the modulating signal. The invention might also be used to sense the relative flatness of revolving disk support surfaces used to support magnetic storage disks used for bulk storage in computer applications. Such disks must not wobble as they spin at high RPM's lest the flying heads floating over the disks crash into the surface and ruin the head and the disk. The invention could also be used as a microphone to pick up sound waves traveling in air or water where the sound waves are extremely weak but are capable of moving a reflecting surface.

A principal application of the present invention is to acquire detailed knowledge of the propagation characteristics such as frequency and amplitude of acoustic waves traveling through solids. Such information can be used in evaluating other devices such as surface acoustic wave delay lines, filters and sonic wave guides. Further, the invention can be used to test parts for cracks since the surface acoustic wave propagation characteristics change around the vicinity of cracks in the sample surface. Very tiny cracks not visible to the naked eye can be detected in this manner in critical high stress parts such as turbine blades for jet engines and various parts in the engine and power train of automobiles.

Prior art apparatus for measuring surface acoustic wave propagation characteristics were of the bulk optic variety in that they required lasers to beam coherent beams of light toward the sample surface. The beams were reflected by the surface and converted to electrical signals by some form of detector. Such prior art systems were very inconvenient because of the necessity of bringing the laser to the workpiece which might be located in a manufacturing area having temperature and vibration conditions which are not conducive to precise control necessary for the successful operation of such systems. Such random, uncontrollable environmental phenomena such as temperature changes vibration and electromagnetic noise from motors in machines in manufacturing areas can cause problems in precisely aligning the optical equipment and electromagnetic noise problems in the sensitive electronic equipment which is used in such systems. Such equipment is used to convert the optical data to signals which can be interpreted to derive the propagation characteristics of the surface displacements of interest.

SUMMARY OF THE DISCLOSURE

The present invention is the a fiber-optic sensor for detecting very small displacements in surfaces which are capable of reflecting light. The invention can be an all fiber optic construction and requires no bulk optic components. This structure has the advantage of allowing the sensitive electronic equipment connected to the optical detector and other optical elements of the system to be placed in the controlled environment of an optical lab where electromagnetic noise can be shielded out, temperature can be controlled and vibrations are not present. The light signals can then be piped out to the workpiece in the manufacturing area by long optical fibers. The invention is insensitive to path length fluctuations resulting from scanning of uneven surfaces or from fiber length fluctuations or fluctuation in the optical characteristics of the fiber caused by temperature or vibration effects in the manufacturing area. This is because these effects cause equal phase changes in the counterpropagating light signals that travel the same geometric path but in opposite directions resulting in zero relative phase shift.

Accordingly, an object of the invention is an improved surface acoustic wave sensor which has other applications as well. A key feature of the invention is the use of a fiber interferometer for sensing vibrations in a test surface.

The invention involves a structure for splitting a single coherent light signal into two coherent light bursts or wavetrains traveling toward the test surface over different paths, each of which paths imposes a different time delay on the wavetrain traveling therein. The two wavetrains traveling by different paths arrive at the test surface at different times and they are incoherent with each other because the delay time difference for the two paths exceeds the coherence time of the source. Near the test surface, the two wavetrains are combined on one optical path and are directed toward the test surface.

In the preferred embodiment, the two optical paths to the test surface are two monomode fiber optic wave guides of differing geometric lengths which are joined by two directional couplers, one of the light source to split the single source wavetrain into two coherent wavetrains with one wavetrain traveling in each fiber and one coupler at the test surface such that the two differentially delayed wavetrains are combined into a single fiber optic probe which then directs the wavetrains toward the test surface. The original single coherent light signal is supplied by a laser diode in the preferred embodiment. The probe also collects the reflected wavetrains from the surface and guides them back to the second directional coupler.

If the test surface is undulating due to a surface acoustic wave propagating therein, or if the surface is moving back and forth toward the end of the probe, i.e., a vibrating plane, the two wavetrains arriving at the surface at different times will travel different geometric paths from the probe end to the surface. The geometric path is the physical path length as opposed to the optical path which is equal to the index of refraction times the geometric path length. The difference in geometric paths for the two arriving pulse wavetrains will cause a phase shift of one reflected wavetrain relative to the other.

The reflected light wavetrains from the sample surface are each split into two wavetrains traveling away from the sample surface over paths which impose different time delays. Thus, there are four reflected light wavetrains. In the preferred embodiment, the reflected signals travel away from the surface over the same paths and encounter the same time delays as the two incoming wavetrains traveling toward the sample surface.

In the preferred embodiment, the coherence length of the light source is less than the differential optical path length between the two directional couplers. That is, the time delay difference T in the time it takes for the two incoming pulses to travel from the first directional coupler to the second directional coupler is greater than the coherence time of the laser source. This means that when the two wavetrains arrive at the sample, they are separated by a time T and are incoherent relative to each other. Each of the two reflected signals is again split into two parts with each part traveling on one of the two optical fibers between the first and second directional couplers. Therefore, there are four possible paths for the four wavetrains or components of energy derived from the initial coherent light signal. Two of these paths have the same geometric length except for the differing distance from the end of the probe to the sample surface caused by undulations or vibration in the sample surface. The first and the fourth of these paths have different geometric length. The result is that, of the four reflected light wavetrains, two of these wavetrains take the same geometric path back to the detector albeit in different directions while two take paths of different geometric length. When the four reflected light signals arrive at the first directional coupler, they are combined on one wave guide leading to the detector input resulting in three pulses arriving sequentially in time with their relative timing related to the different geometric path lengths which each component took. The first and the third pulses are incoherent relative to each other because they are separated by the time delay 2T. The second and the third pulses, however, are coherent at the detector even though they were incoherent at the sample. This occurs by virtue of the fact that the two wavetrains were separated by the delay time T which is longer than the coherence time of the laser upon arrival at the sample but the earlier arriving wavetrain is delayed by the time T on the way back to the detector while the later wavetrain is not so delayed.

The detector generates an output current which is proportional to the intensity, i.e., the amplitude squared, of the combined, interfering wavetrains. The amplitude of the combined wavetrain depends upon the phase difference between the light signals arriving from the test sample which took the same overall geometric path length from the laser to the detector, except for the small variations in the geometric path lengths between the probe and the test surface. Two coherent wavetrains of amplitude A and the same frequency, which are exactly in phase, will result in a wavetrain of amplitude of 2A whereas two wavetrains which are of the same frequency and which have the same amplitude A, but which are 180 degrees out of phase, will result in a signal having zero amplitude.

The method for detecting small time varying displacements in a surface comprises generating a coherent light wavetrain and splitting that burst into first and second wavetrains or bursts of coherent light. The first wavetrain or burst is guided along a first optical path which imposes a first time delay. The second wavetrain or burst is guided along a second path which imposes a shorter time delay than the first path. The differential time delay T is either greater than the coherence time of the source of continuous wave operation or is greater than the duration of the burst for burst type operation of the source. The reason for the time delay/coherence time requirement is that the two light signals arriving at the test sample surface must either arrive at different times such that they do not overlap if coherent, or, if they overlap in time, they must be incoherent in the overlapping portions such that no interference can occur between the two signals at the sample.

The second optical path is geometrically shorter than the first optical path in the preferred embodiment which causes the differential time delay T.

At the test sample surface, some of the energy from each of the first and second bursts or wavetrains is combined in a probe and directed toward the surface. Because of the differential delay T, the first and second bursts or wavetrains arrive sequentially in time. The probe then receives reflected energy from the surface from each wavetrain or burst and guides it to a splitting means where each reflected burst is split into two reflected bursts or wavetrains, each of which is guided along a separate optical path toward a photodetector.

Before reaching the detector, some of the energy from each of the four reflected signals from the first and second optical paths are combined by a directional coupler in a fourth optical path which is coupled to the input of the photodetector. The photodetector then detects the phase difference between the bursts which traveled the same geometric path length from the light source to the detector except for the differences in geometric path length between the end of the probe and the surface at the two different times of arrival for the incoming waveforms. The phase difference is detected by sensing the amplitude of the combined bursts by generating a signal which is proportional to the intensity of the burst.

The invention will be more readily apparent from study of the following detailed description and the appended claims when studied in light of the drawings.

BRIEF DESCRIPTION OF THE DRAWINGS

FIGS. 3A–3D are timing diagrams showing the relative arrival times at the surface and at the detector of the four wavetrains that follow the paths of FIGS. 2A–2D.

DETAILED DESCRIPTION OF THE PREFERRED EMBODIMENT

Figure 1:
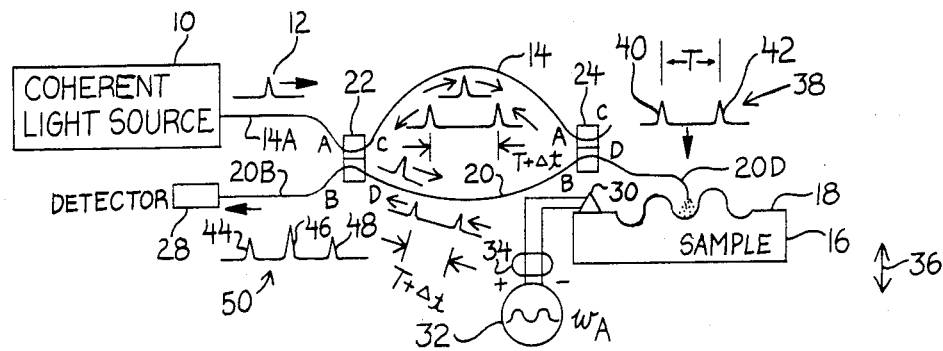
FIG. 1 is a schematic diagram illustrating the invention.

FIG. 1 is a schematic diagram illustrating the invention. A partially coherent light source 10 functions to supply a partially coherent light wavetrain either as a pulse or burst, as is illustrated at 12, or as a continuous wave (cw) of light having a predetermined coherence length. The light source 10 is butt coupled or otherwise aligned with the end of a first monomode fiber optic wave guide 14A which provides a first optical path toward a sample 16 having a test surface 18. The first optical fiber 14 is coupled to a second monomode fiber optic wave guide 20 by a first directional coupler 22 having ports A, B, C and D. The details of the directional coupler are described in *Electronics Letters*, Vol. 16, No. 7 at page 260-1 published on Mar. 27, 1980 and in a co-pending U.S. patent application, Ser. No. 139,511, filed Apr. 11, 1980. The fiber 14A entering the port A of the coupler 22 continues through the coupler and emerges as a fiber 14 from the port C. The directional coupler 22 can be tuned to couple any fraction of the amount of light energy in the first optical fiber 14 into a second optical fiber 20 which provides a second optical path. The second optical fiber 20 enters the port D of the coupler 22 and emerges as the fiber 20B from the port B. Actually, the fibers 14A and 14 are segments of the same fiber and the fibers 20B and 20 are segments of the same fiber.

The first and second optical fibers 14 and 20 are again coupled near the test sample by a second directional coupler 24 which also has ports A, B, C, and D. The length of the optical fibers 14 and 20 between the directional couplers 22 and 24 is not the same in the preferred embodiment. The first optical fiber 14 has a longer geometric length than the second optical fiber 20. The difference between the geometric length of the fiber 14 between the coupler 22 and 24 and the length of the fiber 20 between the couplers 22 and 24 will be called the differential path length. The purpose of the differential path length is to impose a differential time delay T on all wavetrains passing through the first optical fiber 14 in either direction relative to the wavetrains traveling in the fiber 20 in the same direction. For cw operation, the delay time T should be greater than the coherence time of the coherent light source 10 for reasons which will be explained in connection with the description of the operation of the invention.

A fiber optic probe 20D is coupled to the D port of the second directional coupler 24. In the preferred embodiment, the second optical fiber 20 enters the second directional coupler 24 at the port B and continues uninterrupted through the coupler and emerges at the port D as the fiber optic probe 20D. In the preferred embodiment, the fiber optic probe is placed close enough to the surface 18 to receive as much reflected light as possible of the light directed toward the surface. A microscope lens system can be placed between the end of the fiber and the substrate surface being examined to optimize the light collection efficiency. Larger probe to sample distances can be used, for example, if a higher power laser is used or if an amplifier is used at the detector output.

The other end of the second optical fiber 20 enters the first directional coupler 22 at the port D and continues uninterrupted through the directional coupler and emerges at the port B as the fiber optic wave guide 20B which carries the combined reflected pulses to a detector 28. In the preferred embodiment, the detector 28 is a photodiode which is coupled to the fiber segment 20B. The segment 20B of fiber optic wave guide 20 is aligned with the detector 28 such that light pulses emerging from the end of the segment 20B fall as near as possible to the junction of the photodiode 28 so as to obtain maximum sensitivity of the diode to incident light. It is well known that incident light falling upon a photodiode at a distance somewhat removed from the junction location will cause hole-electron pairs to be formed in the semiconductor material. However, not all of these holes and electron reach the junction. Part of the current generated in the diode is lost because of recombination during travel of the holes and electrons through the semiconductor material. In fact, the output current for a given light intensity falls off as a function of the distance of the illuminated spot from the junction. Therefore, the maximim sensitivity will be achieved in the invention if the segment 20B of fiber optic wave guide is precisely aligned with the location of the junction in the photodiode of the detector 28.

For purposes of discussion, the movement of the test surface 18 of the sample 16 is shown as being caused by a transducer 30 which is driven by a driver 32 which provides an electrical driving signal. The driving signal on the conductors 34 is converted to mechanical motion by the transducer 30 which causes vibrations to propagate through the sample 16. These variations manifest themselves as surface acoustic waves causing the test surface 18 to undulate in accordance with the frequency and the amplitude of the surface acoustic wave. In the example shown, the driver 32 supplies a sinusoidal driving wave form having a frequency $\omega_A$. The driving wave form need not necessarily be sinusoidal, however. The sample 16 could, in other applications, be moving in motion back and forth in the direction indicated by the arrow 36 as opposed to having vibrations propagating therethrough causing surface acoustic waves. Such movement can also be sensed by the apparatus of FIG. 1.

The directional couplers 22 and 24 function to split the original single wavetrain 12 into four light wavetrains which reach the detector 28. Each of the four wavetrains takes a different optical path, but two of the paths have the same geometric length except for differences in the geometric path between the end of the probe 20D and the test surface 18 of the sample 16. The first wavetrain of light 12 is split by the first directional coupler 22 into two wavetrains traveling toward the surface 18, one in each fiber. The directional coupler 22, in the preferred embodiment, is tuned to 3 dB coupling such that approximately half the incoming energy is coupled out to the other fiber optic wave guide in the coupler. That is, the wavetrain 12 coming in on fiber segment 14A has 50% of its energy coupled into the second optical fiber 20 and the remaining 50% of the energy on the fiber 14A stays in the first optical fiber 14 and exits at the port C.

The portion of the light signal traveling towards the surface 18 in the fiber 14 experiences a time delay T relative to the delay experienced by the portion of the light signal traveling towards the surface 18 in the fiber 20. The second directional coupler 24 is also a 3 dB (50%) coupler in the preferred embodiment. The two incoming light signals at the ports A and B of the second directional coupler 24 are combined in the probe 20D by coupling part of the energy coming in at the port A into the probe 20D and coupling part of the incoming energy at the port B to the fiber 14 to exit at the port C while leaving the balance of the incoming energy at the port B in the fiber 20 to exit at the port D. The two wavetrains, separated by the delay T in the probe 20D, are directed towards the surface 18. The time displacement between the two wavetrains 40 and 42 traveling toward the surface is illustrated generally at 38 in FIG. 1.

A portion of each of the incoming wavetrains 40 and 42 is reflected from the surface 18 and is received by the probe 20D. These two reflected wavetrains travel through the probe 20D and enter port D of the second directional coupler 24. Part of the energy of each of the two reflected wavetrains is coupled into the first optical fiber 14 and exits from the port A traveling away from the surface 18. That is, in the preferred embodiment, half of the energy in each of the reflected wavetrains is coupled into the first optical fiber 14 and travels therein away from the surface 18, while the other half of the energy entering the port D remains in the second optical fiber 20 and exits from the port B. Both of the two reflected wavetrains exiting from the port A and from the port B travel away from the surface 18 separated by the delay time T plus A differential delay time Δt which results from differences in the distance to the surface 18 from the end of the probe 20D at the different times of arrival of the wavetrains 40 and 42 at the surface 18.

Each of the pairs of reflected wavetrains traveling in the fibers 14 and 20 experience another delay in traveling between the coupler 24 and the coupler 22. However, the pair of reflected wavetrains traveling in the fiber 14 encounter a delay which is longer than the delay encountered by the pair of reflected wavetrains traveling in the fiber 20 with the difference equal to the differential delay time T.

Upon reaching the directional coupler 22, half the energy from each of the reflected wavetrains entering at the port C is coupled into the fiber 20. These two wavetrains exit from the port B and travel along the fiber segment 20B to the detector 28. Half of the energy of each of the reflected wavetrains traveling away from the surface in the fiber 20 is coupled into the fiber segment 14 where it exits from the port A toward the light source 10 and is lost. The remaining half of the energy passes through the coupler 22 and exits at the port B. These two reflected wavetrains are guided along the fiber segment 20B to the detector 28.

Figure 2A:
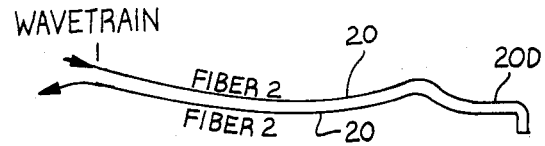
FIGS. 2A–2D are diagrams of the four possible paths that the wavetrains traveling between the light source and the detector can take.

Each of the four reflected wavetrains takes a different optical path from the coherent light source 10 to the detector 28. These four possible paths are illustrated in FIGS. 2A through 2D. FIG. 2A shows the shortest possible geometric path from the light source 10 to the detector 28. The FIG. 2A path represents that portion of the light energy which travels through the fiber segment 14A, transfers to the second optical fiber 20 in the first directional coupler 22 and passes through the second directional coupler 24 by entering the port B and exiting the port D and thereafter travels through the probe segment 20D to the surface 18. From the surface 18, the first wavetrain that travels the path of FIG. 2A is reflected back up into the probe segment 20D whereupon it passes through the second directional coupler 24 by entering the port D and exiting the port B. It then travels through the second optical fiber 20 and enters the first directional coupler 22 at the port D exiting therefrom at the port B. This first wavetrain then travels to the detector 28 in the fiber segment 20B. Because the FIG. 2A path is the shortest possible geometric path from the light source to the detector 28, the first wavetrain arrives first at the detector as the pulse 44 illustrated generally at 50 in FIG. 1.

Figure 2B:
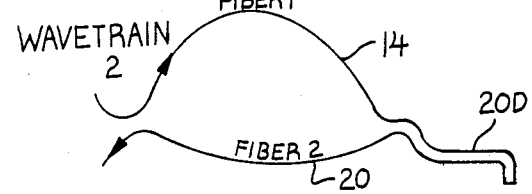

The second wavetrain which follows the path of FIG. 2B enters the first directional coupler 22 at the port A and exits at the port C traveling in the fiber 14 to the port A of the second directional coupler 24. Part of the energy of this wavetrain is coupled into the second fiber 20 and exits via the port D where it is guided by the probe segment 20D to the surface 18. The remaining energy in the fiber 14 exits at the port C and is lost. From the surface 18, part of the energy is reflected back into the probe 20D and enters the second coupler 24 at the port D exiting therefrom at the port B. The reflected wavetrain then travels away from the surface 18 in the fiber 20 entering the port D of the first coupler 22 and exiting therefrom at the port B where it is guided to the detector 28.

Figure 2C:
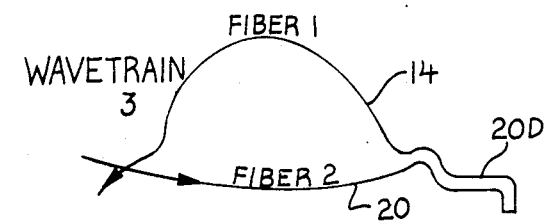

The third wavetrain that travels the path of FIG. 2C enters the first coupler 22 at the port A and is coupled into the second fiber 20 exiting therefrom at the port D. The wavetrain then travels towards the surface 18 in the second fiber 20 entering the port B of the second coupler 24 and exiting therefrom at the port D whereupon it is guided through the probe segment 20D and directed toward the surface 18. Part of the energy is reflected back from the surface 18 into the probe 20D. This reflected wavetrain enters the second coupler 24 at the port D and part of its energy is coupled into the first fiber 14. This coupled energy exits the second coupler 24 at the port A and travels away from the surface 18 in the fiber 14 to enter the first coupler 22 at the port C. The first coupler 22 couples approximately half the energy of the wavetrain energy into the second fiber 20 where it exits at the port B and is guided by the fiber segment 20B to the detector 28. The other half of the energy exits the coupler 22 at the port A and is lost.

FIGS. 2B and 2C represent the two geometric paths which have the same geometric path length from the light source 10 to the detector 28 except for differences in the geometric distances between the end of the probe 20D and the surface 18 if the surface 18 is moving. The wavetrains which follows the path of FIGS. 2B and 2C arrive at the detector 28 at approximately the same time except for a time difference Δt caused by movement of the surface 18. These two wavetrains are coherent when they reach the detector 28, and they will, therefore, interfere with each other. The time difference Δt translates into a certain phase shift between the second and third wavetrains of FIG. 2B and FIG. 2C. This phase shift is caused by the difference in the geometric path length between the end of the probe 20D and the surface 18 at the two different times at which these two wavetrains arrive at the surface 18 as will be explained in more detail below.

The FIG. 2B and FIG. 2C wavetrains are combined and interfere in the fiber segment 20B thereby causing a pulse 46 in FIG. 1. The amplitude of the pulse 46 depends upon the phase difference between the second and third wavetrains and can be interpreted to determine the amplitude of the movement of the surface 18 relative to the end of the probe 20D.

Figure 2D:
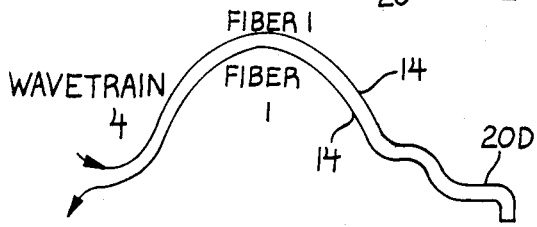

The wavetrain which travels the path illustrated in FIG. 2D travels the longest geometric path from the light source to the detector 28. This wavetrain enters the first coupler 22 at the port A and half its energy exits the coupler 22 at the port C traveling toward the surface 18 in the first fiber 14. The wavetrain then enters the second coupler 24 at port A and half of its energy is coupled into the second fiber 20. This energy exits the coupler 24 at the port D whereupon it is guided toward the surface 18 by the probe segment 20D. Part of the energy is reflected from the surface 18 back into the probe 20D where it is guided into the second coupler 24 at port D. Half of the energy entering the port D is coupled back into the first fiber 14 and exits the second coupler 24 at port A. This reflected wavetrain travels away from the surface 18 in the fiber 14 and enters the port C of the first coupler 22. Half the energy entering the port C is coupled into the second fiber 20 and exits from the port B whereupon it is guided by the fiber segment 20B to the detector 28. The other uncoupled half of the energy exits port A and propagates through the fiber segment 14A and is lost. The wavetrain following the path of FIG. 2D arrives last in time of the four wavetrains arriving at the detector 28. This fourth wavetrain is illustrated generally at 50 as the pulse 48 of FIG. 1.

FIGS. 3A through 3D show timing diagrams for the various arrival times of the four wavetrains corresponding to the paths shown in FIGS. 2A through 2D. FIG. 3A corresponds to FIG. 2A, FIG. 3B corresponds to FIG. 2B and so on.

Referring to FIG. 3A, wavetrain one 42 arrives at the surface 18 after a time $t_2$ which represents the delay in propagation through the second fiber 20 in FIG. 1. After leaving the end of the probe segment 20D, wavetrain one 42 encounters an additional delay $\Delta t_{A1}$ which represents the time which it takes the light to travel from the end of the probe to the sample surface 18 and back up to the probe. Thereafter wavetrain one 42 encounters another delay of time $t_2$ in traveling back toward the detector 28 in the second fiber 20. Wavetrain one emerges from the fiber segment 20B as the pulse 44 in FIG. 1 at a time $2t_2 + \Delta t_{A1}$.

Referring to FIG. 3B, the timing of wavetrain two is shown. Wavetrain two arrives at the sample after a time $t_1$ which represents the propagation time through the longer first optical fiber 14. The differential geometric path length causes a differential delay period T represented by the time difference $t_1-t_2$. The differential path length and the delay T must exceed the coherence length and coherence time of the light source 10 so that the signals 40 and 42 at the sample end of the loop will not interfere with each other if continuous wave laser operation is used. However, a coherent light source having a longer coherence length than the differential path length could be used, provided that short bursts are used having a duration shorter than the delay T such that the wavetrains 40 and 42 in FIG. 1, although coherent, would not overlap in time thus preventing any interference at the sample.

Wavetrain two encounters a delay $\Delta t_{A2}$ representing the amount of time it takes for this wavetrain to leave the probe 20D, travel to the surface 18 and travel back to the probe 20D. Thereafter wavetrain two experiences a propagation delay $t_2$ representing the travel time through the second fiber 20. Wavetrain 2 arrives at the detector 28 after a time $t_1 + t_2 + \Delta t_{A2}$.

Wavetrain three travels the loop between the couplers 22 and 24 in the opposite direction as wavetrain two. Referring to FIG. 3C, it is seen that wavetrain three arrives at the sample after a time $t_2$ representing the propagation time through the second optical fiber 20. Wavetrain three experiences a differential time delay of $\Delta t_{A3}$ representing the time it takes to travel from the probe to the surface 18 and back to the probe. Thereafter, wavetrain three travels back through the first optical fiber 14, a trip which takes a time $t_1$, and arrives at the detector after a time delay of $t_1 + t_2 + \Delta t_{A3}$. Therefore wavetrains two and three arrive at the detector 28 at approximately the same time except that they are shifted in time by an amount $\Delta t = \Delta t_{A2} - \Delta t_{A3}$.

Inspection of FIG. 3D shows that wavetrain four arrives at the detector 28 after a time $2t_1 + \Delta t_{A4}$. This is a substantially different arrival time from the arrival time of wavetrain one. Wavetrain four emerges from the fiber segment 20B in FIG. 1 last in time as the pulse 48 indicated generally at 50 in FIG. 1.

It can be seen from inspection of FIGS. 3A and 3C that the pulse 42 arriving at the sample is actually comprised of the combined wavetrains one and three arriving at a time $t_2$. Likewise, from inspection of FIGS. 3B and 3D it is apparent that the pulse or wavetrain 40 arriving at the sample 16 is comprised of the combined wavetrains 2 and 4 arriving after a delay of $t_1$.

Because wavetrains one and four arrive at the detector separated by a time delay of approximately 2T, wavetrains one and four will not interfere even if they overlap in time. This is because they are incoherent relative to each other since T exceeds the coherence time of the source 10. However, wavetrains two and three arrive at approximately the same time, the difference in their arrival time being the differential time of propagation for each from the end of the probe to the surface 18 and back to the probe. Although wavetrains 2 and 3 were incoherent relative to each other when they arrived at the sample 16 because they were separated in time by the delay T, the delay T is imposed in the reverse fashion on the trip back to the detector to slow the first arriving wavetrain (three) down so as to become coherent again with the later arriving wavetrain (two).

Figure 4:
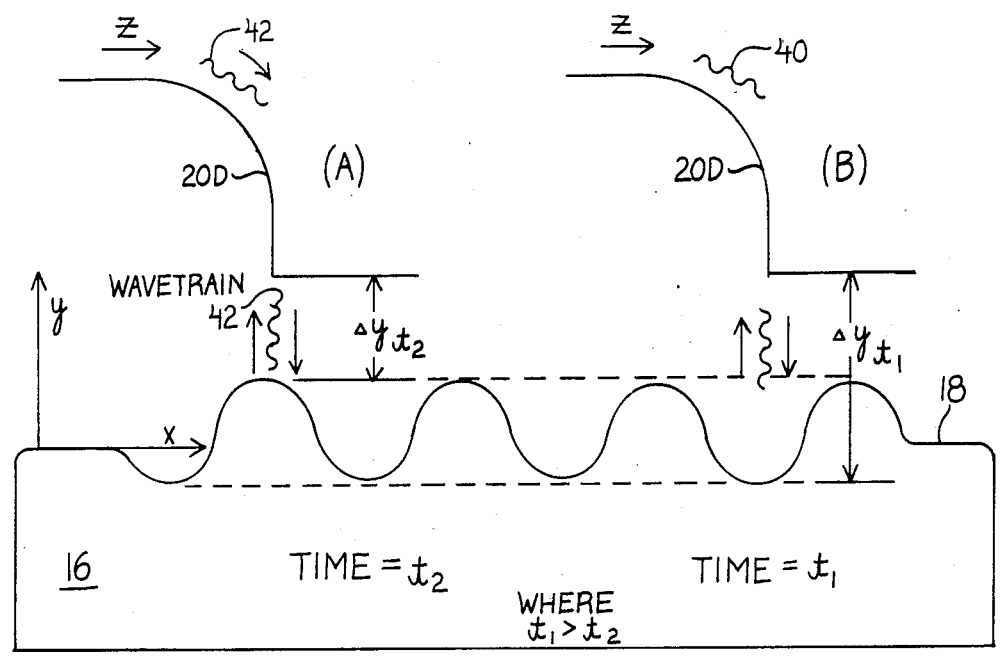
FIG. 4 is a diagram of the interaction of the second and third wavetrains with the surface of the sample.

FIG. 4 shows a graphic representation of how the amplitude of the surface acoustic wave, or the planar movement the surface 18 toward and away from the probe, changes the path length to the surface 18 for the wavetrains one through four comprising the signals 42 and 40. FIG. 4A represents the time $t_2$ when the signal 42 arrives at the surface 18. FIG. 4B represents the later time $t_1$ when the wavetrain 40 arrives at the surface 18. For purposes of this discussion three axes have been established for reference: y is the vertical direction or the direction of travel of wavetrains between the end of the probe 20D and the surface 18; x is the direction of travel of the surface acoustic wave along the surface 18, and z is the direction of travel along the optical fiber.

A mathematical expression for the amplitude of the wavetrain 42 at any point z on the fiber is given in equation 1 below.

The amplitude of reflected wave at any point z in the probe at any time t is:

$$e^{j(\omega t - kz - 2kA \sin \omega At)} \tag{1}$$

where
- $\omega$ = the angular frequency of the light
- $t$ = the time
- $k$ = the wave number of the light, i.e., $(2\pi)/\lambda$, where $\lambda$ equals the wavelength of the light. Wavelength equals the distance traveled by the wave during one cycle or $(c/f)$ where c equals the speed of light in meters per second and f equals the frequency in cycles per second. The wave number times the distance traveled, z, represents the angle of a phasor expressing the light wave at the point z in the fiber. The last expression $2kA \sin \omega_A t$ represents the phase shift caused by the transit time for the path $\Delta y$ traveled by the wavetrain from the end of the probe 20A to the surface 18 where $A \sin \omega_A t$ represents the amplitude A of a sinusoidal surface acoustic wave of frequency $\omega_A$. The term $2kA \sin \omega_A t$ represents the phasor angle reached during the transmit time for travel to the surface and back when the amplitude of the surface wave is $A \sin \omega_A t$.

In FIG. 4A, the differential path to the surface 18 from the end of the probe 20A for the wavetrain 42 is $\Delta y_{t2}$ which equals:

$$\Delta y_{t2} = D - A \sin \omega_A t_2 \qquad (2)$$

where D = the fixed distance to the surface when there is no surface displacement.

In FIG. 4B, the differential path to the surface 18 from the end of the probe 20A for the wavetrain 40 is $\Delta y_{t1}$ which equals:

$$\Delta y_{t1} = D - A \sin w_A t_1 \qquad (3)$$

Since $t_1$ is greater than $t_2$, a phase difference between the wavetrains 42 and 40 arises. Expressed another way, the phase difference $\phi_A$ between the reflected wavetrain resulting from the wavetrain 42 and the reflected wavetrain resulting from the wavetrain 40 is:

$$\phi = \overline{A}(\Delta^4 y_t \pi - \Delta y_{t1}) t_2 = \frac{4\pi}{\gamma} A(\sin \omega_A t_2 - \sin \omega_A t_1) \qquad (4)$$

or the wave number times 2 times the path difference to the surface 18 at the different times $t_1$ and $t_2$.

The point is that to determine the desired unknown, i.e., the amplitude A of the surface acoustic wave, it is necessary to measure the phase difference between the reflected wavetrains.

It is well known that two coherent light waves of the same frequency will interfere with each other if they overlap in space and time and are of the same polarization. The resulting amplitude at any point in space and time from the interfering waves equals the sums of all the amplitudes of the waves which interfere at the same point in space and time. When wavetrains two and three are coupled by the coupler 22 into the fiber segment 20B, they coexist in space and time and will interfere because they are coherent, i.e., the phase difference between all points on one wave relative to the corresponding points on the other wave is the same. The amplitude of the signal 46 (the second signal at the detector 28) will depend upon the phase difference between wavetrains two and three. The amplitude $A_{46}$ of the signal 46 at the detector will be $$A_{46} = A_2 + A_3 = A_2 e^{j\omega t} + A_3 e^{j(\omega t - \phi_A)} \qquad (5)$$

where $A_{46}$, $A_2$ and $A_3$ represent the phasors defining the signal 46 and the wavetrains two and three respectively. A phasor is a rotating vector in the complex plane where the vertical axis (y axis) is imaginary, represented by the operator $j = \sqrt{-1}$, and the horizontal axis is the real axis. Formula (5) represents a vector addition.

Figure 5:
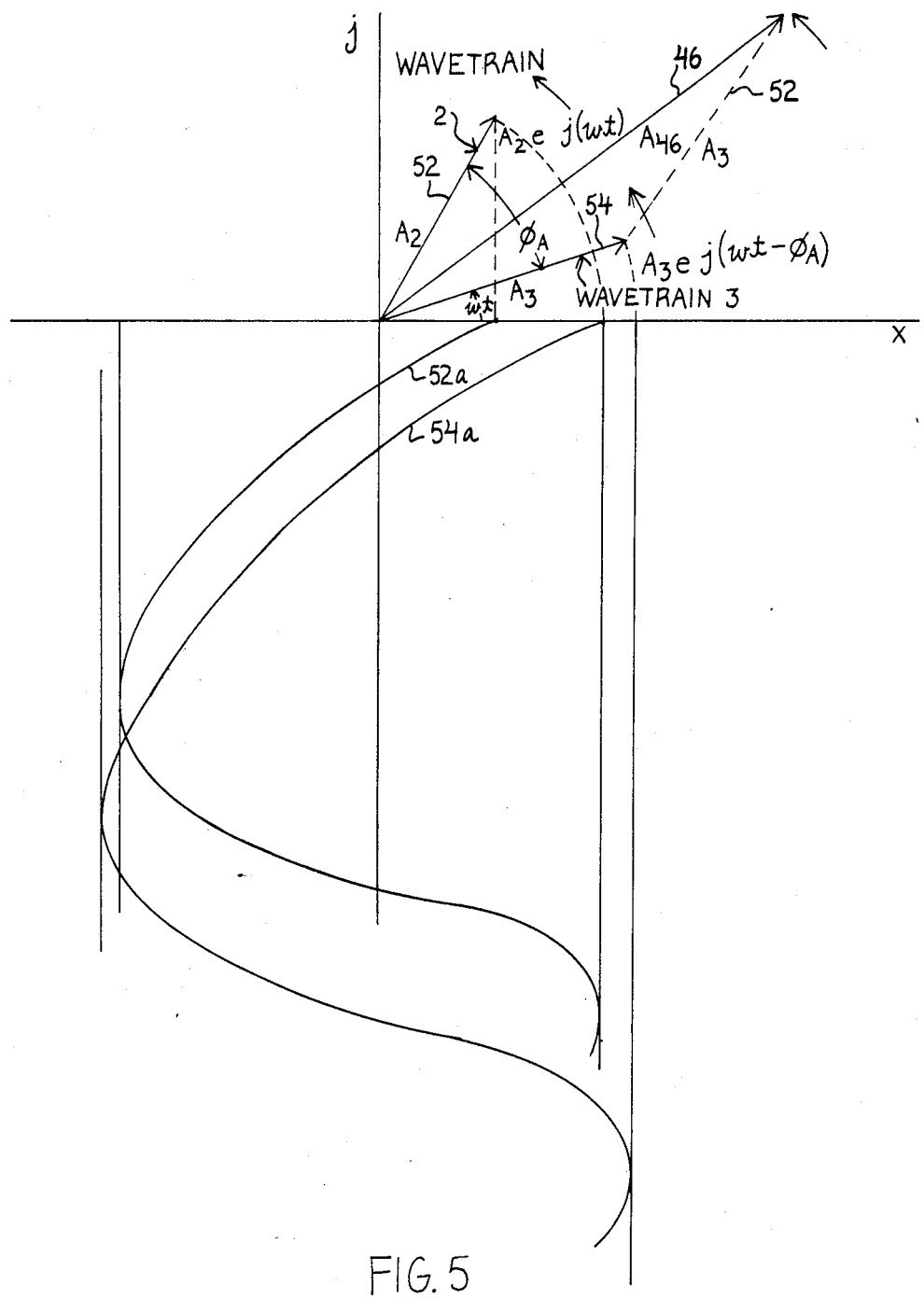
FIG. 5 is a vector addition diagram illustrating the addition of the wavetrains two and three at the detector 48.

FIG. 5 illustrates the vector addition represented by the Formula (5). Wavetrain two is represented by the phasor 52 having the amplitude $A_2$. Wavetrain three is represented by the phasor 54 having the amplitude $A_3$ and lagging the phasor 52 by the phase angle $\phi_A$. The amplitude of each phasor is the length of the arrow and its phase angle is the angle to the x axis. The angles represent the angular velocity of rotation of the phasors times the time of arrival at the detector as shown for the wavetrains two and three in FIGS. 3B and 3C. The vector addition is done by taking the phasor 52 and placing its tail at the head of the phasor 54 at the same relative angle $\phi_A$ as shown in phantom in FIG. 5. The resultant phasor $A_{46}$ represents the signal 46 at the detector 28 in FIG. 1.

The projections of the phasors 52, 54 and 46 on the real axis x represent the sinusoidal functions expressing the amplitudes of the signals in time. That is, the sinusoid 54a plotted below the phasor diagram represents the projection of the phasor 54 on the real axis and the sinusoid 52a represents the projection of the phasor 52 on the real axis. The function 52a is:

$$\hat{A}_2 = A_2 \sin \omega t \qquad (6)$$

and the function 54a is:

$$\hat{A}_3 = A_3 \sin (\omega t - \phi_A) \qquad (7)$$

The detector 28 is only sensitive to intensity but intensity is a function of amplitude. Total intensity I from two interfering waves of amplitude $A_2$ and $A_3$ is related to the amplitudes of the two components by:

$$I_{det} = (\hat{A}_2 + \hat{A}_3)^2 \qquad (8)$$

Therefore the intensity at the detector 28 is:

$$I_{46} = \hat{A}_2^2 + \hat{A}_3^2 + 2\hat{A}_2\hat{A}_3 \qquad (9)$$

where $A_2$ and $A_3$ are the phasors representing wavetrains two and three. The current out of the detector resulting from the combined wavetrains two and three will be proportional to the intensity of the signal 46 at the detector, $I_{46}$. Only the last term $2\hat{A}_2\hat{A}_3$ will be dependent upon the amplitude A of the movement of the surface 18 because only the magnitude of $\hat{A}_2\hat{A}_3$ depends on the phase difference $\phi_A$ between wavetrains two and three. This last term $2\hat{A}_2\hat{A}_3$, when expressed in terms of sinusoids, is:

$$\hat{A}_2\hat{A}_3 = \sin (\omega t) \sin (\omega t - \phi)_A \qquad (10)$$

where $\phi_A$ is related to A by the formulas (2), (3) and (4) above by a simple trigonometric identity:

$$\hat{A}_2\hat{A}_3 = \cos (2\omega t - \phi_A) + \cos \phi_A \qquad (11)$$

It can be seen from equation (4) that $\phi_A$ in equation (11) varies proportionally to the amplitude A of the surface wave to the first power. Further, if a fixed phase shift of $\pi/2$ is added between wavetrains two and three when there is no surface displacement, then the last term in equation (11) becomes sin $\phi_A$. If $\phi_A$ is small, then it follows that there will be an output therm in $I_{46}$ which varies linearly with $\phi_A$ and hence is linearly proportional to the amplitude A of the surface wave, and has a frequency $\omega_A$. This is useful because an integrating lock-in amplifier is used to filter out just the desired last term of equation (10). Part of the process of doing this filtering involves integration over a long time period to improve the signal to noise ratio. The output voltage from the lock-in amplifier will be zero for no surface movement and will vary linearly with the amplitude A of the displacement.

It is desirable to have a sensitive linear sensor which will generate an output signal which is linearly proportioned to the surface wave amplitude and which has a zero output voltage for a zero surface displacement. Certain modifications, including the addition of a lock-in amplifier, help obtain these objectives. These modifications to the structure of FIG. 1 are shown in FIG. 6.

Figure 6:
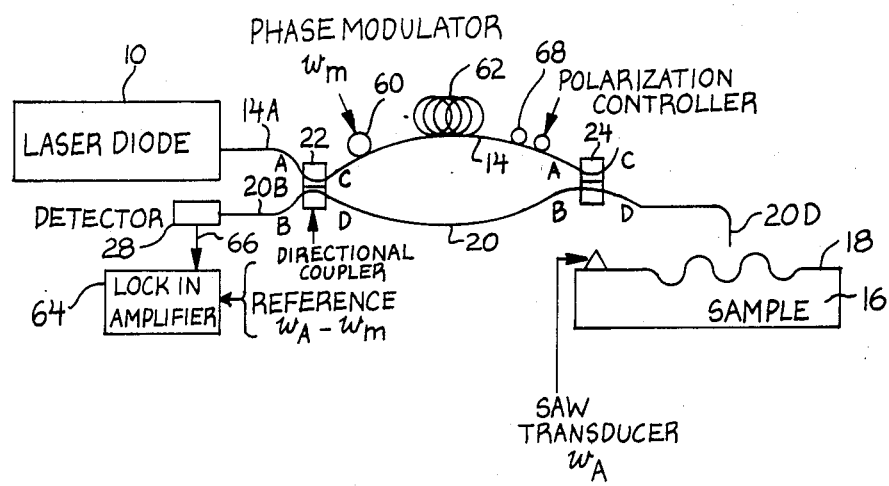
FIG. 6 is the preferred embodiment of the invention.

FIG. 6 is a schematic of a surface acoustic wave (SAW) sensor in accordance with the preferred embodiment of the invention. A laser diode 10 is connected to the optical fiber 14A and the detector 28 is connected to the optical fiber 20B. The fibers 14A and 20B pass through the 3 db directional coupler 22 which divides the optical signal from laser diode 10 equally between the lines 14 and 20. After passing through the directional coupler 22, the fiber 14 passes through a phase modulator 60 and then through a plurality of coils 62 of optical fiber which function as a delay time. A polarization controller 68 allows any plane of polarization to be selected for light leaving the controller in either direction for input light in any plane of polarization. This allows control of the polarization of the light signals being interfered in the fiber segment 20B such that the two counterpropagating wavetrains arrive at the detector in the same polarization and it allows the selection of any constant relative phase shift between the counterpropagating wavetrains to be interfered. Fibers 14 and 20 then pass through the second directional coupler 24 with the fiber 20D extending from the coupler 24 to direct the optical signal to the surface 18 of the sample 16. The optical signal is then reflected back into the fiber probe 20D. The fibers 14 and 20 between the directional couplers 22 and 24 comprise a closed loop optic fiber interferometer. A lens (not shown) can be added between the sample and the optical fiber to increase the amount of light collected from the surface.

The phase modulator 60 is a block of piezoelectric material that is driven by an electrical signal having a frequency $\omega_M$ such that the block changes its physical dimensions through radial expansion. The optical fiber 14 is wrapped around the block such that time varying forces are placed on the fiber 14 which stretch the fiber. Said stretching causes the path length of the counterpropagating wavetrains to vary sinusoidally at the frequency of the drive signal for the phase modulator. This causes each counterpropagating wavetrain to be phase modulated by a time varying phase shift relative to the same wavetrain traveling through the same fiber in the absence of the phase modulator.

The principal reason for the presence of the phase modulator 60 is to cause lower difference frequencies to be generated to which the detector is more sensitive as will be explained below. The principal cause of the sinusoidal change in relative phase is the increased and decreased relative propagation times for the counterpropagating wavetrains in the fiber 14 versus their propagation times if there was no phase modulator. When this phase shift at the frequency $\omega_m$ of the modulator 64 is added to the $\omega_A$ frequency of phase shift caused by the surface displacement, a modulation effect occurs which generates phase shifts at the sum frequency and at the difference frequency $\omega_A - \omega_M$, i.e., upper and lower sidebands are created. Some additional harmonics are also generated.

That is, the presence of the phase modulator causes heterodyning or interference beating to occur at the detector which causes the aforementioned upper and lower sidebands of energy to exist. The lower sidebands are desired because they have a frequency of $\omega_A - \omega_M$ which is lower than the acoustic wave frequency $\omega_A$. This lower frequency lies in a range of frequencies to which the detector 28 is more sensitive which causes the sensor of FIG. 6 to be more sensitive with the phase modulator 60 present than when it is not present, although the invention will work without the presence of the phase modulator 60.

The phase modulator 60 could theoretically be placed anywhere in the fiber path of the second and third wavetrains, but placement between the couplers 22 and 24 is preferred.

Any other form of modulation could also be used to cause the heterdyning to a different, lower frequency. That is, frequency modulation or intensity modulation for example would also work, and any known structure to accomplish these purposes could be substituted for the phase modulator 60 such as some circuit to intensity modulate the light source 10. Such a technique would have the advantage that intensity modulation of a laser diode can be accomplished at a much higher frequency than can be accomplished with present phase modulators. This means that much higher frequencies of surface acoustic waves can be sensed because the lower sideband frequency can be always be kept in the frequency range of the best sensitivity for the detector 28.

To determine the maximum amplitude of the SAW, the length of the delay loop 62 of fiber in the fiber 14 must be chosen such that the relative delay T is long enough to cause the signals 40 and 42 to arrive at a peak and trough of the longest wavelength of interest of the acoustic wave or surface displacement. That is, T determines the lowest frequency acoustic wave of which the maximum amplitude can be measured. The presence or absence of lower frequencies can be sensed with a given T but the maximum amplitude thereof cannot be determined unless T is increased. The length of the loop 62 must also be chosen such that the optical propagation time through it is greater than the coherence time of the laser. It is important that the difference in transit times of fiber 14 relative to fiber 20 be such that the signals 40 and 42 in FIG. 1 arrive in either of two conditions: coherent but not overlapping in time; or, overlapping in time but one wavetrain incoherent relative to the other. The reason is that interference must be avoided in the probe so that two, separate and independent wavetrains arriving at different times can be observed. If one wavetrain interfered with the other in the probe, the phase shift effect caused by the surface movement would not be observable, and there would be no way to determine the amplitude and frequency of the movement of the surface 18. Thus, for cw operation the length of the fiber 20 is not critical other than that the differential path length between the fibers 14 and 20 must exceed the coherence length of the source 10. Where low power lasers are used, continuous wave operation is better in terms of signal-to-noise ratio performance because the output of the detector 28 can be integrated over a longer period. This gives better discrimination of the desired lower sideband component of the detector output signal on the line 29 over the laser noise, shot noise and thermal noise generated in the system. For continuous wave operation, the coherence length must be shorter than the differential path length. This can be achieved by using a multilongitudinal mode laser diode such as a GO-ANA laser diode manufactured by General Optronics. Higher power lasers can be operated with short pulses or bursts and coherence length is not a problem so long as the duration of the bursts is related to the differential time delay T such that there is no wavetrain overlap in time at the sample between the signals 40 and 42 and their reflected counterparts.

In the preferred embodiment the optical fiber 14 is coiled to create the delay, but in other embodiments, variable delay lines such as the structures described in international patent application PCT/US82/01609 filed Nov. 12, 1982, or PCT/US82/01608 filed Nov. 12, 1982, and described in an article dated Nov. 11, 1982, entitled "Fiber Optic Variable Delay Lines", Electronics Letters, Vol. 18, No. 23, pp. 999–1000 or other delay line structures might be used.

A lock-in amplifier 64 is used to filter and integrate the electrical output signal from the detector 28 on the wire 66. Because the lock-in amplifier has an upper cutoff frequency of 100 kHz, heterodyning, as caused, for example by use of the phase modulator 60, is necessary to beat the acoustic frequency down to a range within the frequency response of the lock-in amplifier. It will be seen from equation (12) below that the output signal from the detector 28 has a D.C. component, a zero term, and upper and lower sideband components plus harmonics thereof. The lower sideband component has an amplitude which varies linearly with the amplitude of the surface displacement for small surface displacement amplitudes and has a frequency equal to the surface displacement frequency $\omega_A$ minus the frequency of the phase modulator $\omega_M$. This is the only component of interest, and must be filtered out from the rest of the frequency components in the output of the detector 28.

Because the lock-in amplifier acts as a very narrow bandpass filter, its presence vastly improves the sensitivity of the system since it filters out all unwanted components of the output signal on the line 66. That is, it selects, integrates over time and amplifies only the desired lower sideband component. The integration over time assures a good signal-to-noise ratio. The lock-in amplifier selects and filters out the desired frequency component by comparing the incoming frequencies with a reference frequency set at the frequency of the desired component. In this case the reference signal is set at the lower sideband frequency $\omega_A - \omega_M$ and is derived from the two driving signals for the phase modulator 60 and the SAW transducer 30. The system will work without the lock-in amplifier such as by substituting an oscilloscope, but the lock-in amplifier is the preferred embodiment. Any conventional lock-in amplifier will do with the proper upper cutoff frequency, i.e., a cutoff frequency greater than the lower sideband or difference frequency.

A polarization controller 68 is placed in the fiber 14 between the first and second couplers to control the polarization of the light leaving the polarization controller in either direction. Light traveling in an optical fiber at one polarization travels at a different speed than light traveling in the same fiber at a different polarization because of birefringence. Birefringence is the property of optical fiber which causes light polarized in different orientations to travel at different velocities through the same fiber. It is important in this application that precise control of phase shifts between two wavetrains moving in different fibers be maintained. For this reason, multimode fiber would not work well because the modal dispersion possible in multimode fiber renders precise control of relative phase shifts impossible. Any polarization can be set at the polarization controller 68. Because the geometric paths to the detector 28 from the controller 68 for each of the counter propagating wavetrains is different, and because the velocities of propagation in different polarization modes are different, thus allowing adjustment of the optical paths traveled by the counterpropagating light signals so that they are different. Thus, it is possible through adjustment of the controller to create a fixed relative phase shift between the wavetrains to be interfered.

To expand on the above assertion, it is well known that two orthogonal polarization modes of propagation with two different indices of refraction exist in monomode fibers. Because the two different polarization modes have different indices of refraction, they propagate at different velocities since the index of refraction is another way of defining the velocity of propagation. The polarization controller 68 can be located anywhere between the couplers 22 and 24 as long as the position is offset from the geometric center of the path from the light source to the detector. The differing geometric paths from the controller to the detector for the counterpropagating wavetrains two and three traveling in the same polarization results in different transit times for each wavetrain. This results in a fixed, selected phase difference between them. That is, for a greater distance traveled by one counterpropagating wavetrain in one polarization compared to a different, shorter distance traveled by the other counterpropagating wavetrain in the same polarization, a relative phase shifts between the two wavetrains will arise because of the different transit times through the same path.

The controller 68 is adjusted in the preferred embodiment such that wavetrains two and three are in the same polarization and $\pi/2$ radians out of phase when there is no displacement of the surface 18. The two wavetrains must be in the same polarization at the detector 28 for maximum interference. The $\pi/2$ fixed phase shift results from the differing geometric path lengths around the loop in opposite directions while in the same polarization as explained above. The details of the structure and operation of a polarization controller that will work in the embodiment of FIG. 6 are given in U.S. patent application Ser. No. 183,975 filed on Sept. 4, 1980 and in an article entitled "Single Mode Fiber Fractional Wave Devices and Polarization Controllers" by Herve Levre, published in *Electronics Letters,* Vol. 16, No. 20, of Sept. 25, 1980, in the February 1981 issue at page 62-3 describing a polarization. Of course any other structure which can control the polarization and relative phase shift in accordance with criteria described herein will suffice.

By the operation of the polarization controller 68 and the phase modulator 60, a constant relative phase change results between the counterpropagating wavetrains two and three where each wavetrain is also modulated with a time-varying phase difference at the frequency of the phase modulator 60.

A $\pi/2$ relative phase difference between the two intefering sinusoidal input components to the detector on the fiber 20B means that the two inputs can be expressed as sin and cosine functions since these two functions are $\pi/2$ radians out of phase.

The resultant phase change between wavetrains two and three which combine to form the second pulse or light signal 46, varies with the amplitude of the surface wave as follows. Assuming that the wavetrains which travel the paths of FIGS. 2B and 2C do not experience a phase shift at sample 16, the two signals will be $\pi/2$ radians out of phase and will recombine such that the output voltage from the lock-in amplifier 64 resulting from the second of the signals 46 has zero amplitude since the integral of sin time cosine over one period of the resulting function is zero. That is, the integral done by the lock-in emplifier 64 of the product of sin and cosine coming from the detector 28 on the line 66 over any multiple of the period of the function sin times cosine equals zero.

However, the presence of an acoustic wave on sample 16 will increase the amplitude of the recombined signal 46. The amplitude of the signal 46, increases to twice the amplitude of the first and third signals 44 and 48 when the acoustic amplitude is equal to $(\lambda/4)$, where $\lambda$ is the optical wavelength, and the two wavetrains traveling the paths of FIGS. 2B and 2C encounter a maximum and a minimum of the acoustic wave. Thus, by adjusting the time delay between the signals 40 and 42 in FIG. 1 so that the first signal 42 reflects from the peak of the traveling surface wave and the second signal 40 reflects from the trough of the surface wave, there will be a phase difference between the two reflected signals which can be interpreted to derive the amplitude of the surface wave. Accordingly, the amplitude of the acoustic wave can be detected by observing the amplitude of the signal 46 and the frequency of the acoustic wave can be determined from the time variation of the center pulse relative to the positions of the signals 44 and 58 or by using a variable differential time delay T which corresponds to peaks and troughs of the surface acoustic wave.

If an optical pulse is used which is shorter in duration than the acoustic period, a detection bandwidth greater than the acoustic center frequency will be required. Importantly, since the two recombined wavetrains follow the same fiber paths (but in opposite directions), any temperature or pressure induced variations in the fiber length do not affect the amplitude of the output voltage, provided that the fluctuations are slow as compared to the time delay T. Similarly, variations in the probe to sample surface distance resulting from scanning non-optically flat samples will not cause a variation in the ratio of the center signal 46 to the outer signals 44 and 48.

An examination of the described sensor of FIG. 6 shows that without the $\pi/2$ phase shift caused by the polarization controller 68, the output signal is proportional to $(kA)^2$ where k is the optical wavenumber and A is the acoustic wave amplitude. If there is some change in the birefringence of the fiber due to vibrations or temperature changes, this $\pi/2$ phase shift cannot be assured. Therefore, as an additional precaution, a linear dependence on the kA and greater sensitivity is obtained by using the phase modulator 20 at a frequency $\omega_M$ in the loop and by detecting the output at the difference frequency of $\omega_A - \omega_M$. An analysis of the output of the detector 28 on the line 66 using the phase modulator 60 shows that the output voltage is $$V = V_0\{J_0(\gamma_A)J_0(\gamma_M) + 2J_1(\gamma_M)J_1(\gamma_A)(\sin[(\omega_A - \omega_M)t + \phi_A - \phi_M] + \sin[(\omega_A + \omega_M)t + \phi_A + \phi_M]) + 2J_2(\gamma_M)J_0(\gamma_A)\sin(2\omega_M t + 2\phi_M) + 2J_2(\gamma_A)J_0(\gamma_M)\sin(2\omega_A t + 2\phi_A) + \ldots\} \quad (12)$$

where $\gamma_A = 2kA \sin[(\omega_A T)/2]$, $\gamma_M = 2kM \sin[(\omega_M T)/2]$, M is the length the fiber is stretched by the phase modulator, $J_i$ is the Bessel function of the first kind of order i, and $V_0$ is given by $$V_0 = [(e\eta R I_0 \alpha)/(4\hbar\omega_0)] \quad (13)$$

where R is the detector load impedance, $\eta$ is the detector quantum efficiency, $I_0$ is the laser power coupled into the fiber, and $\alpha$ is the relative amount of light reflected off the sample and coupled back into the fiber core. Equation (12) is derived by taking the series expansion of the exponential describing the phase shift caused by the surface displacement, i.e., equation (1), and multiplying it by the series expansion which is equivalent to the exponential describing the phase shift caused by the phase modulator 60. In specific embodiments the values for these parameters were $T = 1$ μs, $f_A = 500$ kHz, $f_M = 400$ kHz, $I_0 = 450$ μW,
$R = 10$ kΩ, $\eta = 0.8$ and $\alpha = (10)$ In most applications, the acoustic amplitude is orders of magnitude smaller than the optical wavelength and the output at the frequency $\omega_A - \omega_M$ is $V_{out} = \gamma A$. The proportionality constant $\gamma$ is theoretically predicted to be 52 μ$V_{rms}$/Angstrom when the voltage applied to the phase modulator is adjusted to maximize $J_1(kM)$.

Figure 7:
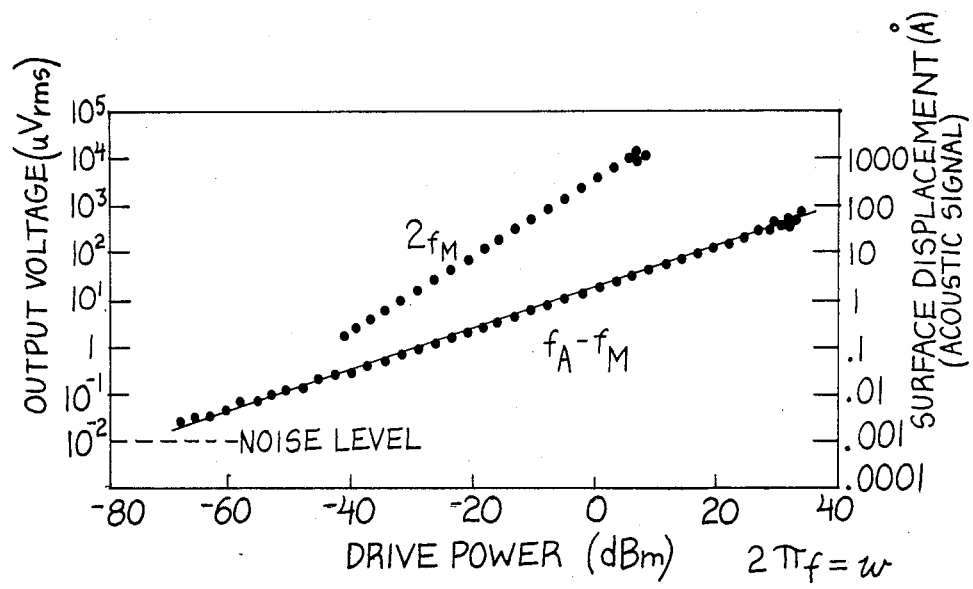
FIG. 7 is a graph of the output voltage of the sensor versus surface displacement.

Using a polished stainless steel sample excited by a 6 cm wide PZT transducer with a center frequency of 0.5 MHz, the output voltage dependence on acoustic power is shown in FIG. 7. It can be seen that the dependence is linear over the range in acoustic power of 110 dB. The power output at $2\omega_M$ as a function of the phase modulator power is also plotted in FIG. 7. This sensor can be easily and precisely calibrated by comparing the output at the difference frequency $\omega_A - \omega_M$ with the maximum output at $2\omega_M$, i.e., 26 m$V_{rms}$ in this embodiment. In this way, the proportionality constant $\gamma$ between the surface acoustic wave amplitude amplitude and the output rms voltage was found to be $\gamma = 24$ μV/Angstrom. With a lock-in amplifier integration time of 0.1 sec, the rms noise level was 0.01 μV, which results in a sensitivity of 0.0003 Angstroms. The best sensitivity reported previously was 0.002 Angstroms for the same integration time.

One reason a smaller acoustic amplitude can be detected is that a low-frequency output ($\omega_A - \omega_M = 2\pi 100$ kHz) is obtained by appropriately adjusting the phase modulator frequency. Consequently, a high input impedance amplifier can be connected to the detector, and the output signal will be large enough that thermal noise is small compared to shot and laser noise. However, in one prior art sensor described in in an article by R. L Whitman and A. Korpel, Applied Optics 8, 1567 (1969), two relatively high frequencies must be detected and the thermal noise of the first amplifier is often the limiting factor. For fiber probe applications where the acoustic frequency is significantly higher than available fiber phase modulator frequencies, a low-frequency output can still be obtained by modulating the intensity of the laser diode at a frequency $\omega_{LD}$. In this case a difference frequency output is obtained at a frequency of $\omega_A - \omega_{LD} \pm \omega_M$. The output signal decreases by 8 dB because (1) $I_1/I_0 = \frac{1}{4}$ for the laser diode used here, for modulation frequencies up to 1.3 GHz, and (2) half of the signal is upshifted to $\omega_A + \omega_{LD} \pm \omega_M$.

Figure 8:
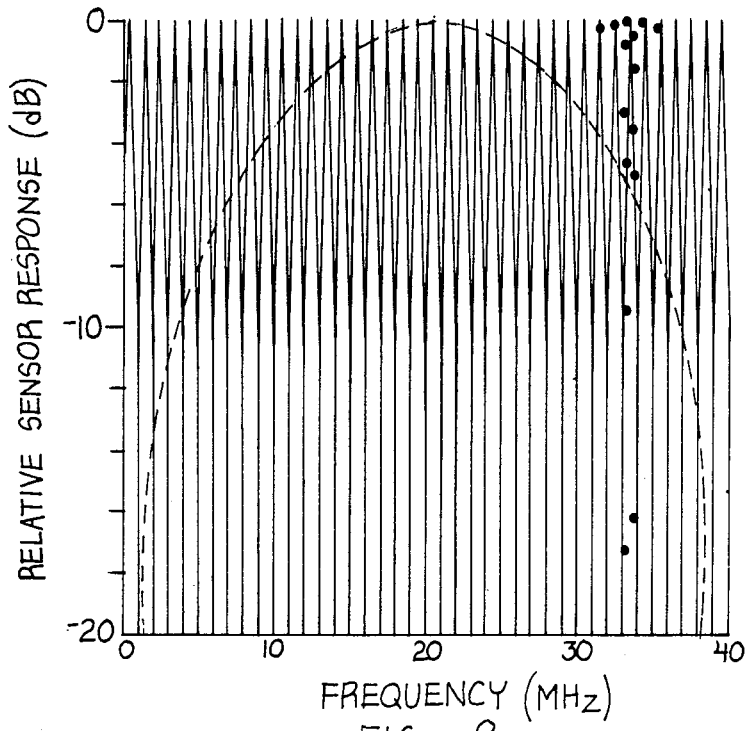
FIG. 8 is a graph of the frequency response of the sensor.

The frequency dependence of the sensor sensitivity is important. This dependence is given by the relation between $\gamma_A$ and $\omega_A$ in equation (12), and is plotted in FIG. 8 for two loop lengths T. Typically, the loop length is fixed after the couplers have been fabricated; however, an all-fiber variable delay line allows the frequency response to be adjusted over a wide range. Note that any of the higher harmonics $f = n1/T$, $n = 1, 2, \ldots$ can be used. A LiNbO$_3$ delay line with 34 MHz transducers was used with the thirty-third harmonic of a 1 $\mu$s differential delay loop to obtain the experimental points in FIG. 8. The dynamic range with the LiNbO$_3$ device was 78 dB. The dynamic range is less than 110 dB because (1) the acoustic amplitude decreases as $1/\omega$ for a constant input power to the transducer, and (2) the output drops by 8 dB when the laser diode modulation scheme discussed above is used.

A problem may arise with the use of single mode fibers in this application in getting the reflected light back into the single mode of the fiber. A fiber to substrate distance of 10 micrometers is convenient for scanning and results in 25% of the incident light coupled back into the core for a polished highly reflecting surface, and 13% coupling for a surface with 0.5 micrometer roughness. A SELFOC lens between the fiber and sample can be used to increase the amount of light coupled back into the fiber and also to probe the typically rough samples of interest in nondestructive evaluation.

In alternative embodiments the laser diode can be intensity modulated at a frequency $\omega_{LD}$, and the desired signal can be detected at any of the sum and difference frequencies of acoustic frequency, $\omega_A$, with either $\omega_{LD}$ or $\omega_M$. Typically, the lowest of the difference frequencies is detected thereby allowing the use of a high impedance post detection amplifier which increases the signal-to-noise ratio.

Further, if the reflectivity of a sample varies over the scanning surface, this may cause errors in detecting the acoustic amplitude, as can be seen in equations (12) and (13) with reference to a spatially varying reflectivity $\alpha$. This effect can be minimized by detecting at an additional frequency not containing $\omega_A$, e.g. $\omega_{LD} \pm \omega_M$. The first detected signal is then divided by the additional detected signal whereby dependence on sample reflectivity is eliminated.

There has been described an all-fiber sensor for surface acoustic waves which has improved sensitivity and stability. While the invention has been described with reference to a specific embodiment the description is illustrative of the invention and not limiting the invention. Various modifications and applications may occur to those skilled in the art without departing from the true spirit and scope of the invention as defined by the appended claims.

We claim:

1. An apparatus for detecting small displacements of a surface comprising:

a first directional coupler for dividing a single coherent light signal into first and second coherent light signals;

a first delay line for delaying said first coherent signal relative to said second coherent light signal by a first delay period to provide a delayed first light signal;

a waveguide for directing each of said delayed first and said second light signals onto said surface to produce a first reflected light signal corresponding to said delayed first light signal and a second reflected light signal corresponding to said second light signal;

a second delay line for delaying said second reflected light signal by said first delay period to produce a second delayed reflected light signal; and a detector for measuring the phase difference between said first reflected light signal and said second delayed reflected light signal to measure variations in the geometric path length between said waveguide and said surface.

2. An apparatus as defined in claim 1, wherein said single coherent light signal which is divided by said first directional coupler is a continuous wave of light having a coherence time which is less than said first delay period.

3. An apparatus as defined in claim 1 wherein said single light signal which is divided by said first directional coupler is comprised of a coherent light pulse said pulse having a duration less than said first delay period imposed by said first delay line.

4. An apparatus as defined in claim 2 or 3 wherein said first directional coupler is a 3 dB coupler for evenly slitting said first coherent light signal into said first and second coherent light signals.

5. An apparatus as defined in claim 1 wherein said first delay line is a first fiber optic waveguide and wherein said second coherent light signal is guided to said waveguide by a second fiber optic waveguide which is shorter than said first fiber optic waveguide by an amount sufficient to cause said first coherent light signal to be delayed relative to said second coherent light signal by said first delay period.

6. An apparatus as defined in claim 5 wherein said first and second fiber optic waveguides are coupled together by a second directional coupler and wherein said waveguide is coupled to said first and second fabric optic waveguides by said second directional coupler.

7. An apparatus as defined in claim 6 wherein said second directional coupler recombines said delayed first light signal and said second coherent light signal into two light signals in said waveguide.

8. An apparatus as defined in claim 7 wherein said second directional coupler is bidirectional in that it splits said first reflected light signal into a third reflected light signal which is coupled into said second fiber optic waveguide and a fourth reflected light signal which is coupled into said first fiber optic waveguide and such that said second reflected light signal is split into a fifth reflected light signal which is coupled into said second fiber optic waveguide and a sixth reflected light signal which is coupled into said first fiber optic waveguide.

9. An apparatus as defined in claim 7 wherein said first directional coupler is bidirectional such that it couples part of each of said third, fourth, fifth and sixth reflected light signals to the input of said detector.

10. An apparatus as defined in claim 9 wherein said detector is a photodetector for detecting the intensity of the combined signal resulting from said third and sixth reflected light signals.

11. An apparatus as defined in claim 5 or 6 or 7 or 8 or 9 or 10 further comprising a phase modulator means located in either said first or said second fiber optic waveguides for causing a continuous periodically time varying phase difference in each of the light signals travelling in said first and second fiber optic waveguides.

12. An apparatus as defined in claim 11 wherein said detector generates an output signal component which has an amplitude which is proportional to the amplitude of the surface displacement and which amplitude varies in time at the difference frequency between the frequency of the surface displacement and the frequency of said phase modulator means.

13. An apparatus as defined in claim 12 wherein said detector includes a means for filtering out output signal components at frequencies other than said difference frequency and for integrating said difference frequency component over a plurality of periods of said difference frequency.

14. An apparatus as defined in claim 3 wherein said pulses are also of a duration less than the period of the surface displacement to be sensed.

15. An apparatus as defined in claim 14 wherein said detector has a bandwidth greater than the center frequency of the surface displacement to be sensed.

16. An apparatus as defined in claim 6 or 7 or 8 or 9 or 10 or 14 or 15 further comprising a polarization controller means located in either said first or said second fiber optic waveguide between said first directional coupler and said second directional coupler for causing the portions of said first and second reflected light signals which travel the same geometric path length between said couplers to arrive at said detector in the same polarization.

17. An apparatus as defined in claim 16 wherein said first light signal has a coherence length such that light travelling the longest geometric path to said surface and back to said detector does not interfere with light travelling the shortest geometric path, and wherein said polarization controller means causes the portions of said first and second light signals which travel and same geometric path to said detector arrive there shifted in relative phase by $\pi/2$ radians.

18. A method of sensing small movements of a surface comprising the steps of:
directing first and second optical signals to a surface, said first signal preceding said second signal by a time T;
receiving third and fourth optical signals reflected from said surface in response to said first and second optical signals, said third signal preceding said fourth signal;
delaying said third optical signal by a time T, thereby providing a delayed third optical signal; and
causing interference between said delayed third optical signal and said fourth optical signal to determine the relative phase shift therebetween.

19. The method as defined by claim 18 and further including the step of detecting the amplitude of the combined signal caused by said interference.

20. The method as defined by claim 18 wherein said first and second optical signals are pulses.

21. The method as defined by claim 18 wherein said first and second optical signals are continuous wave signals generated by a short coherence length source.

22. The method of claim 19 further comprising the steps of:
phase modulating the first and second optical signals at a modulation frequency which is related to the frequency of movement of said surface such that the difference frequency between the modulation frequency and the surface movement frequency lies within a predetermined range; and
detecting the amplitude of said combined signal at said difference frequency.

23. The method of claim 19 further comprising the steps of:
intensity modulating said first and second optical signals at a modulation frequency related to the frequency of movement of said surface such that the difference frequency lies within a predetermined range; and
detecting the amplitude of said combined signal at said difference frequency.

24. The method of claim 22 further comprising the steps of:
intensity modulating said first and second optical signals at a second modulation frequency;
detecting the amplitude of said combined signal at either the sum or difference frequency between said modulation frequency and said second modulation frequency to provide a first detected signal;
detecting the amplitude of said combined signal at the difference frequency between said modulation frequency and the frequency of movement of said surface to provide a second detected signal; and
dividing said second detected signal by said first detected signal to provide a measure of the amplitude of the surface movement which is substantially independent of sample reflectivity.

25. A surface acoustic wave sensor comprising:
a light source;
a first optical fiber connected to receive light from said light source;
light detector means;
a second optical fiber connected to transmit light to said light detector means;
a first directional coupler through which said first and second optical fibers pass;
a second directional coupler through which said first and second optical fibers pass; and
a segment of optical fiber extending from said second directional coupler for directing light from said second directional coupler to a sample and for returning reflected light from said sample to said second directional coupler.

26. The surface acoustic wave sensor as defined by claim 25 wherein said first optical fiber is a different length than said second optical fiber between said first and second directional couplers.

27. The surface acoustic wave sensor as defined by claim 26 wherein said one of said first and second optical fibers between said first and second directional couplers includes a phase modulator.

28. The surface acoustic wave sensor as defined by claim 27 wherein said detector includes a lockin amplifier.

29. The surface acoustic wave sensor as defined by claim 26 or 27 wherein one of said first and second optical fibers between said first and second directional couplers includes a polarization controller.

30. The surface acoustic wave sensor as defined by claim 29 wherein said detector includes a lockin amplifier.

31. A method of sensing a surface acoustic wave comprising the steps of:
   directing first and second optical signals to a surface, said first signal preceding said second signal by a time, T;
   receiving third and fourth optical signals reflected from said surface in response to said first and second optical signals, respectively;
   delaying said third optical signal by a time, T, thereby providing a delayed third optical signal; and
   combining said delayed third optical signal and said fourth optical signal thereby providing a combined signal.

32. The method as defined by claim 31 and further including the step of detecting said combined signal.

33. The method as defined by claim 32 wherein said first and second optical signals are pulses and said step of detecting includes detecting the amplitude of said combined signal.

34. The method as defined by claim 32 wherein said first and second optical signals are continuous wave signals generated by a short coherence length source.

35. The method as defined by claim 34 and further including the step of intensity modulating said continuous wave signals.

36. The method as defined by claim 34 and further including the steps of detecting at least two signals and dividing said signals to minimize dependence on the reflectivity of said surface.

* * * * *